(12) United States Patent
Hughes et al.

(10) Patent No.: US 11,937,585 B1
(45) Date of Patent: Mar. 26, 2024

(54) RAPID FEED DISPENSER

(71) Applicant: SINGER EQUITIES, INC., Dallas, TX (US)

(72) Inventors: Doug Hughes, Floyd, NM (US); Larry Hughes, Clovis, NM (US)

(73) Assignee: SINGER EQUITIES, INC., Dallas, TX (US)

( * ) Notice: Subject to any disclaimer, the term of this patent is extended or adjusted under 35 U.S.C. 154(b) by 226 days.

(21) Appl. No.: 17/223,878

(22) Filed: Apr. 6, 2021

Related U.S. Application Data

(60) Provisional application No. 63/005,935, filed on Apr. 6, 2020.

(51) Int. Cl.
*A01K 5/02* (2006.01)
*A01K 5/00* (2006.01)
*A01K 1/10* (2006.01)

(52) U.S. Cl.
CPC ............ *A01K 5/0258* (2013.01); *A01K 5/001* (2013.01); *A01K 1/105* (2013.01)

(58) Field of Classification Search
CPC .............................. A01K 5/0258; A01K 5/001
See application file for complete search history.

(56) References Cited

U.S. PATENT DOCUMENTS

| | | | | |
|---|---|---|---|---|
| 3,675,367 A * | 7/1972 | Amburn | ............... | B65G 33/265 47/1.3 |
| 3,830,203 A * | 8/1974 | Murphy | ................... | A01K 9/00 119/51.13 |
| 3,840,189 A * | 10/1974 | Kanengieter | .......... | A01K 5/002 241/101.8 |
| 3,900,007 A * | 8/1975 | Smith | .................. | A01K 5/0291 119/51.13 |
| 4,361,117 A * | 11/1982 | Tohme | ................. | A01K 5/0258 119/57.6 |
| 4,640,229 A * | 2/1987 | Swartzendruber | ... | A01K 5/0275 119/51.5 |
| 4,665,862 A * | 5/1987 | Pitchford, Jr. | ....... | A01K 5/0275 119/51.11 |
| 4,768,884 A * | 9/1988 | Elkin | ........................ | B29B 9/04 366/50 |
| 4,815,417 A * | 3/1989 | Strong | ............... | A01K 39/0125 119/57.4 |

(Continued)

FOREIGN PATENT DOCUMENTS

| | | | | |
|---|---|---|---|---|
| CN | 102281770 | | 12/2011 | |
| GB | 2168965 A | * | 7/1986 | .............. G07F 11/10 |

(Continued)

*Primary Examiner* — Jessica B Wong
(74) *Attorney, Agent, or Firm* — MILES & STOCKBRIDGE P.C.; David R. Schaffer

(57) ABSTRACT

A method and apparatus for rapidly depositing feed for a large number of animals. The rapid feed dispenser can include a motorized vehicle having a bulk feed bin that can contain hundreds or thousands of pounds of feed, one or more augers that pre-load a feeding dose into a holding area, and a fast-acting valve that quickly dumps the feeding dose as a user drives past a feeding station. While driving from one feeding station to the next, the next feeding dose can be pre-loaded so that by the time the vehicle arrives at the next feeding station, the feeding dose will be loaded and ready to be quickly dumped.

20 Claims, 11 Drawing Sheets

(56) References Cited

U.S. PATENT DOCUMENTS

| | | | |
|---|---|---|---|
| 4,874,283 A * | 10/1989 | Hurley, Jr. | E01C 19/182 404/108 |
| 5,069,165 A | 12/1991 | Rousseau | |
| 5,280,859 A | 1/1994 | Rust et al. | |
| 5,888,044 A * | 3/1999 | Baskerville | A01C 15/003 414/528 |
| 6,182,718 B1 | 2/2001 | Seaton | |
| 6,263,833 B1 | 7/2001 | Runyan et al. | |
| 7,055,559 B2 | 6/2006 | Reinsch | |
| 7,707,754 B2 | 5/2010 | Congdon | |
| 8,622,257 B2 | 1/2014 | Erman et al. | |
| 9,700,013 B2 | 7/2017 | Lahman et al. | |
| 9,914,589 B1 | 3/2018 | Teel et al. | |
| 10,197,014 B2 | 2/2019 | Chandran et al. | |
| 2002/0014062 A1 | 2/2002 | Dillon | |
| 2004/0037674 A1 * | 2/2004 | Hadar | A01D 90/06 414/217 |
| 2005/0284386 A1 * | 12/2005 | Eversole | A01K 5/02 119/57.1 |
| 2010/0239708 A1 * | 9/2010 | Bachman | A01K 5/00 366/132 |
| 2010/0326363 A1 | 12/2010 | Van Den Berg | |
| 2012/0008457 A1 * | 1/2012 | Neier | A01K 5/004 366/190 |
| 2012/0269028 A1 * | 10/2012 | Gordon | B01F 35/4122 366/156.2 |
| 2014/0224179 A1 * | 8/2014 | Mignone | A01K 61/80 119/57.92 |
| 2014/0261199 A1 * | 9/2014 | Rose | A01K 5/0258 119/53 |
| 2016/0362036 A1 * | 12/2016 | Grodecki | A01D 90/10 |
| 2019/0289786 A1 * | 9/2019 | Prystupa | A01C 7/124 |

FOREIGN PATENT DOCUMENTS

| | | |
|---|---|---|
| WO | 2004/070122 | 8/2004 |
| WO | 2008/097080 | 8/2008 |
| WO | 2017/034397 | 3/2017 |

* cited by examiner

US 11,937,585 B1

RAPID FEED DISPENSER

CROSS-REFERENCE TO RELATED APPLICATIONS

This application claims priority to and the benefit of the filing of U.S. Provisional Patent Application No. 63/005,935, entitled "RAPID FEED DISPENSER", filed on Apr. 6, 2020, and the specification thereof is incorporated herein by reference.

BACKGROUND OF THE INVENTION

Embodiments of the present invention relate to a method and apparatus for rapidly dispensing a quantity of a granulated or pellet substance. More particularly, embodiments of the present invention relate to a method and apparatus, which can include a motorized vehicle, to rapidly dispense feed that is particularly useful for large-scale agricultural operations which require regular feeding of numerous animals.

Traditionally, to feed individual animals on a large-scale agricultural operation, for example, on a cattle-raising agricultural operation, persons would typically either follow a loaded mobile feed container and manually move feed from the container into the feed buckets for the animals, or a feed container would be moved to each feed bucket, the container would be stopped, and an auger would then be activated until eventually a desired amount of feed was dispensed. At that point, the auger would be de-activated, and the feed container would then move to the next feed bucket. When individually feeding several hundred, or even thousands of animals at a single operation, these known systems are slow and require a significant amount of time to complete. There is thus a present need for a rapid feed dispenser which is capable of preloading feed into a chute between individual feeding operations and which can very rapidly dump the pre-loaded feed as the dispenser passes by a feeding location.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF SUMMARY OF EMBODIMENTS OF THE PRESENT INVENTION

Embodiments of the present invention relate to an apparatus for dispensing feed that includes a feed bin; a first auger, the first auger positioned to carry feed from the bin up to a pre-loading chute; a feed pre-loading chamber disposed below or at a bottom of the pre-loading chute; a valve, the valve positioned below the feed pre-loading chamber, the valve comprising a motor and a gate; and a discharge chute, the discharge chute communicable with and positioned below the valve. The apparatus can also include a rotational joint in communication with the valve and the discharge chute. Optionally, the apparatus can include a powered vehicle and the feed bin can be coupled to the powered vehicle.

In one embodiment, a sensor can be provided in communication with the discharge tube. The sensor can be coupled to a controller and the controller can be configured to cause activation of the valve motor. One or more inputs can be communicably coupled to the controller and the controller can be configured to adjust one or more time delays associated with opening and/or closing of the valve based on the one or more inputs. The one or more sensors are communicably coupled to the first auger and communicably coupled to the controller. The apparatus can also include a proximity sensor disposed on the pre-loading chute and configured to detect feed that has backed up into the pre-loading chute. The apparatus can also include a plurality of feed bucket holders and/or a trash bin with a grate disposed on top of the trash bin.

The apparatus can include a second auger disposed in a bottom portion of the feed bin that is configured to direct feed to the first auger. Optionally, wash fluid ducting can be attached to the apparatus and can be positioned to direct a wash fluid to an upper portion of the first auger. The wash fluid ducting can be positioned to direct wash fluid to an upper portion of the pre-loading chute and/or into the feed bin.

Embodiments of the present invention also relate to a method for rapidly dispensing feed into a feed station including disposing bulk feed into a feed bin coupled to a motorized vehicle, drawing a dose of feed up from the feed bin with an auger, guiding the dose of feed to a pre-loading chamber; actuating a gate valve to dump feed from the pre-loading chamber, and directing the dumped feed to the feed station through a discharge chute. Optionally, directing the dumped feed to the feed station through a discharge chute can include a user manually manipulating the discharge chute to direct the dumped feed to the feed station by swinging at least a lower end portion of the discharge chute to a desired position. Drawing a dose of feed up from a feed bin with an auger can include counting a number of rotations of the auger to provide a desired size of the dose of feed. Guiding the dose of feed from the auger to a pre-loading chamber can include guiding the dose of feed from the auger to the pre-loading chamber with a pre-loading chute. The method can include washing internal components of a rapid feed dispenser without removing them by directing wash fluid to the internal components via fluid ducting attached to the rapid feed dispenser.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
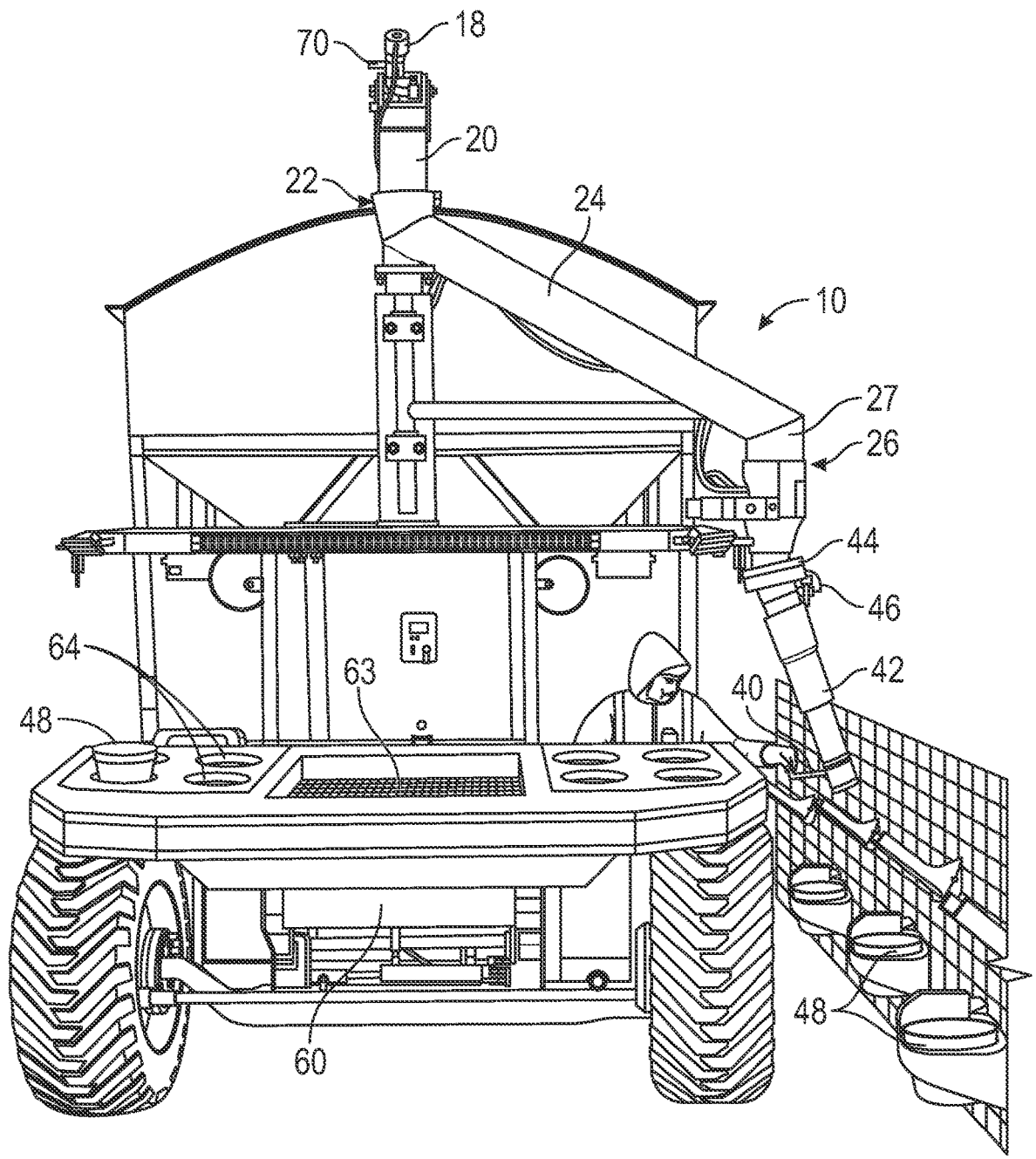
FIG. 1 is a drawing that shows a front perspective view of a rapid feed dispensing vehicle according to an embodiment of the present invention.
Figure 2:
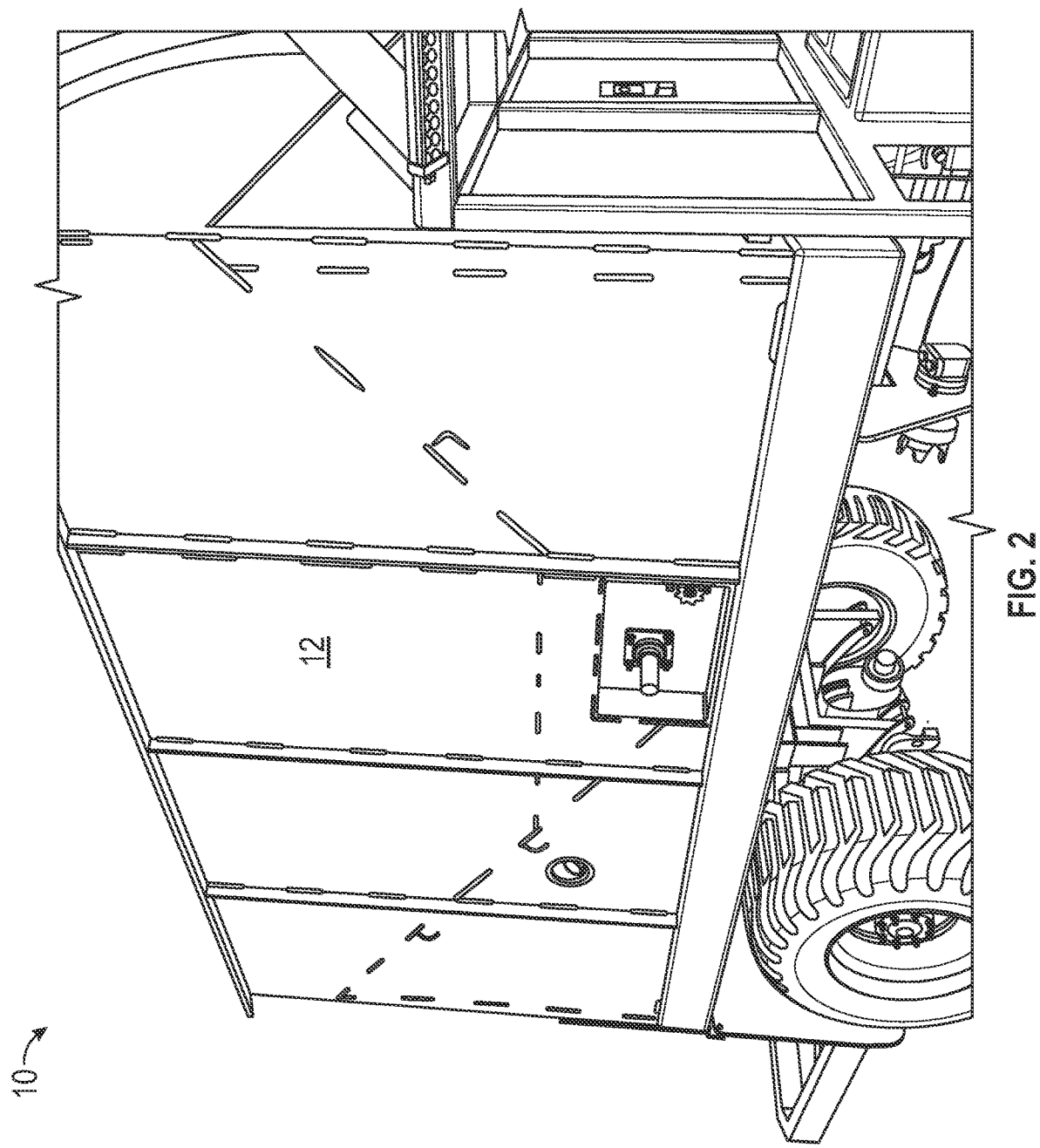
FIG. 2 is a drawing which illustrates a side view of a feed holding bin according to an embodiment of the present invention.

Referring now to the drawings, in one embodiment, automated feed dispenser 10 is preferably disposed on or otherwise incorporated into a powered vehicle and preferably includes feed bin 12 which holds a relatively large quantity of granulated or pellet-type feed (which can include, but is not limited to for example, grain, feed pellets, and/or a combination thereof). In one embodiment, feed bin 12 preferably holds at least about 500 pounds of feed and more preferably at least about 5,000 pounds of feed and most preferably more than 10,000 pounds of feed.

Figure 3:
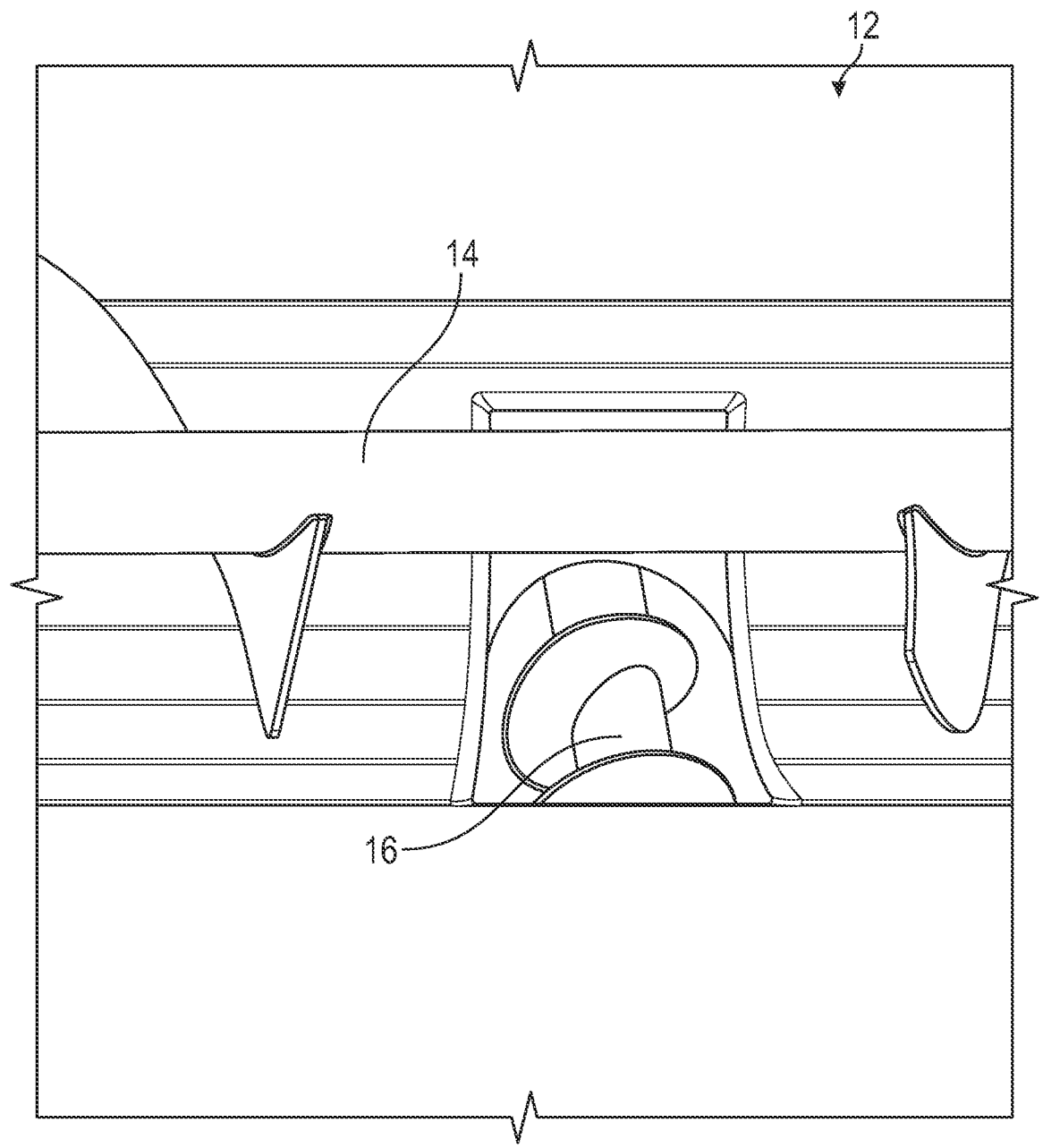
FIG. 3 is a drawing which illustrates an inside bottom portion of a feed holding bin wherein a pair of augers are positioned to draw feed from a bottom of the holding bin.
Figure 4:
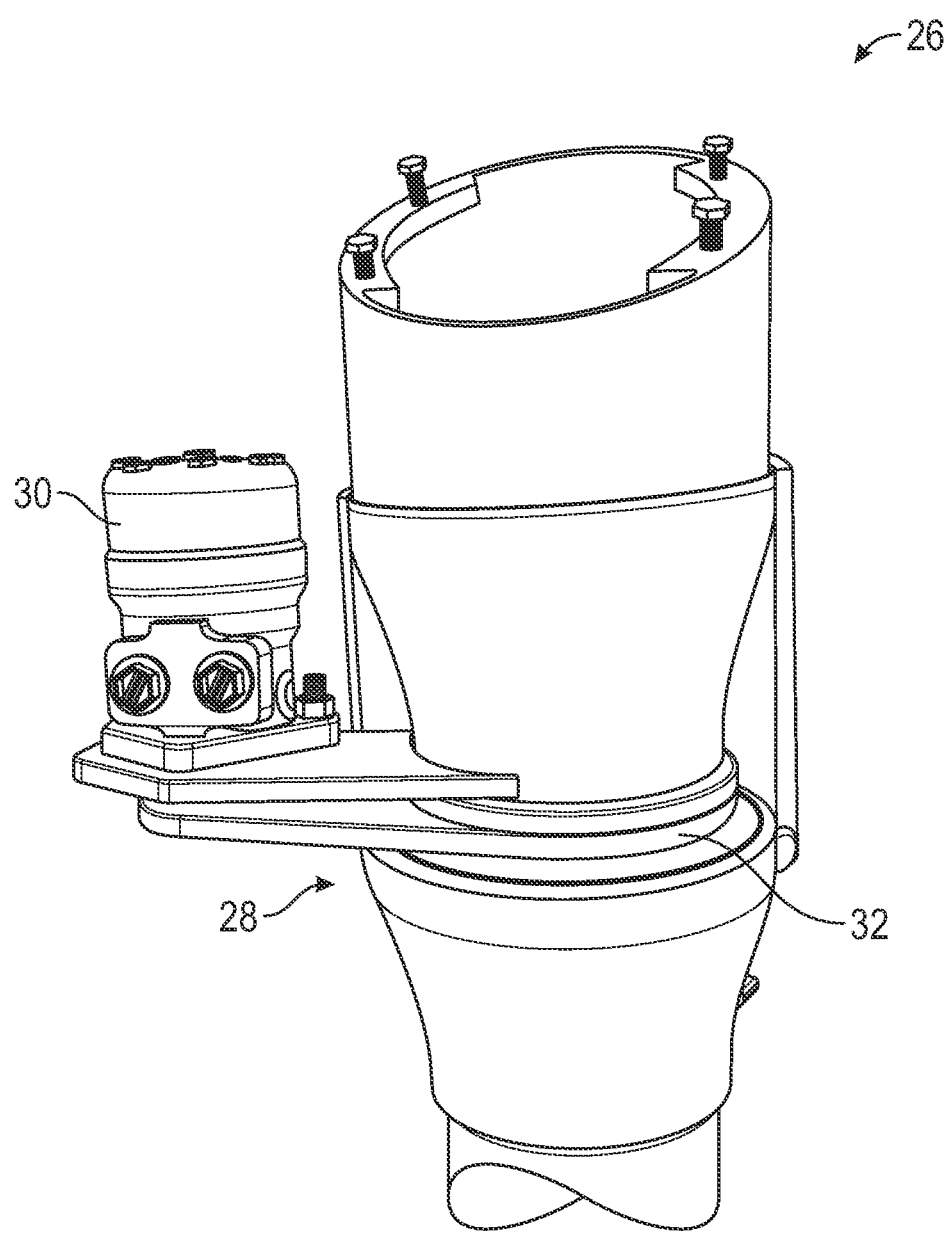
FIGS. 4 and 5 are drawings which illustrate front and side views respectively of a fast-acting swing-gate valve that dumps a load of feed according to an embodiment of the present invention.
Figure 5:
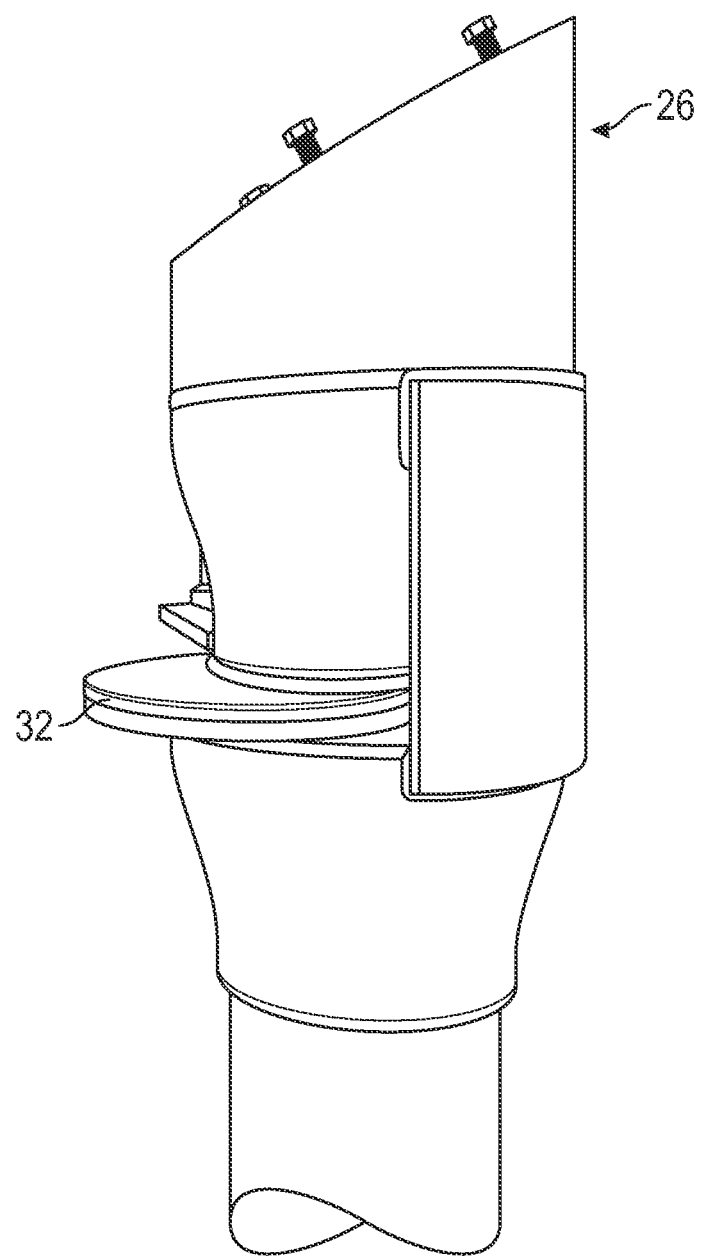
Figure 9:
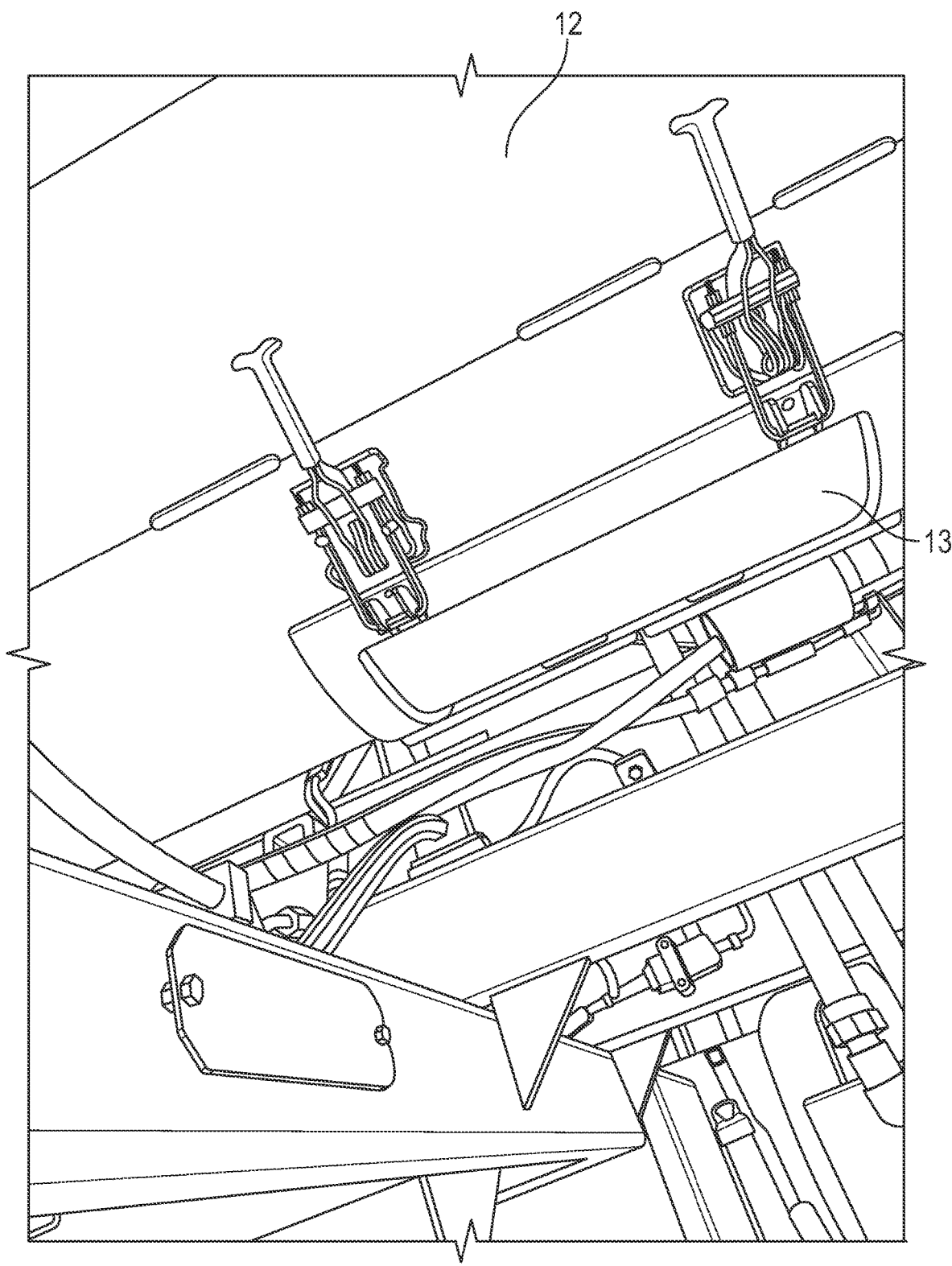
FIG. 9 is a drawing which illustrates a door covering a cleanout at the bottom of a feed holding bin to facilitate cleaning out around a first auger, which is disposed therein, according to an embodiment of the present invention.

As best illustrated in FIG. 3, which illustrates an inside bottom portion of feed bin 12, first auger 14 is preferably positioned within an inside of feed bin 12, near a bottom and across a portion thereof—for example across a width thereof and is preferably configured to move feed toward a center of a bottom of feed bin 12 when first auger 14 is activated. As best illustrated in FIG. 9, cleanout covering 13 preferably covers an opening which provides access into a bottom portion of feed bin 12 such that a user can gain access to an underside of first auger 14 for cleaning and maintenance.

Figure 10:
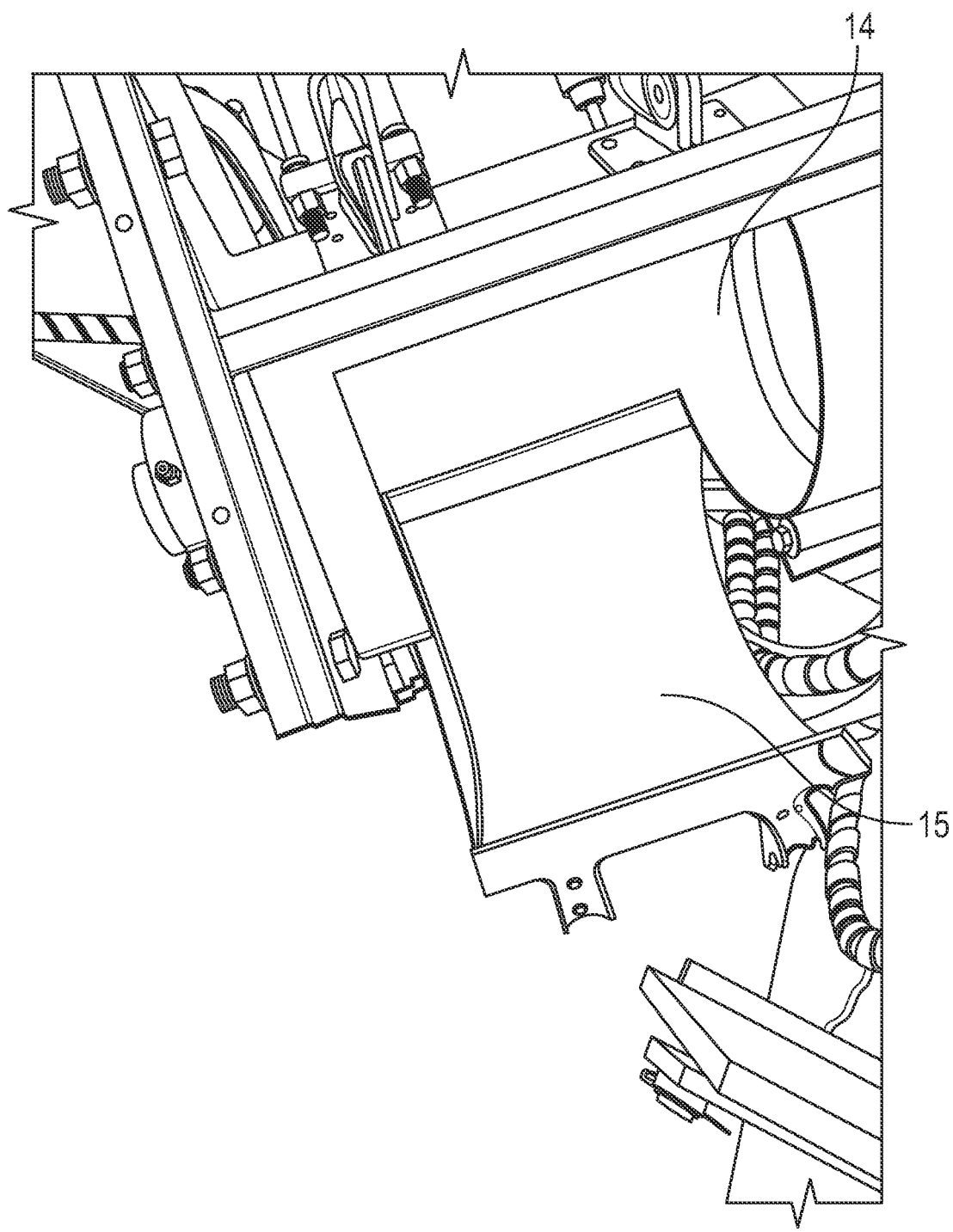
FIG. 10 is a drawing which illustrates a door which provides access to a clean-out that is preferably disposed at or near a bottom portion of a second auger to facilitate access to an internal portion of the auger according to an embodiment of the present invention.

Below first auger 14, most preferably at or near a center bottom portion of feed bin 12, second auger 16 is preferably positioned and configured to move feed up from a bottom of feed bin 12 and toward a top front portion of feed dispenser 10 and is preferably powered by motor 18, which is most preferably a hydraulically-powered motor. Of course, other motors, including but not limited to an electric motor, can be used and will provide desirable results. As best illustrated in FIG. 10, cleanout covering 15 is preferably provided to cover an opening in a lower portion of second auger 16 to facilitate cleaning and maintenance thereof. As feed is drawn up and forward by first auger 14, it preferably falls down first chute 20 which is most preferably adapted at an end thereof to rotate, via rotational joint 22 before the feed then slides down second chute 24. In one embodiment, first auger 14 is not provided. Instead, a bottom of feed bin 12 can be shaped to cause feed to be directed to second auger 16.

Valve 26 is preferably positioned at a lower end of second chute 24. Valve 26 is preferably configured to be able to rapidly open and close—most preferably via a hydraulic motor 30, to which gate 32 is attached such that a partial rotation of motor 30 causes gate 32 to swing open such that feed, which was held back by gate 32, is allowed to fall down through joint 44, which is most preferably constructed as a ball-and-socket joint such that discharge chute 42 can swing forward, back, left, right and combinations thereof and can otherwise have its terminal end freely manipulated by a user guiding it via handle 40, which is connected to discharge chute 42.

Second chute 24 preferably functions as a pre-loading chute by allowing feed to slide down it, after the feed is discharged from second auger 16, so that the feed is pre-loaded into pre-loading chamber 27 above gate 32 of valve 26. Optionally, the pre-loading chamber 27 can be a top portion of valve 26 itself, which is configured to hold a predetermined maximum dose of feed (which can optionally include, for example about 5 pounds of feed), and/or a section of vertical pipe that extends above valve 26. This permits a dose of feed to be filled into pre-loading chamber 27 so that the instant that valve 26 is opened, gravity causes the feed to fall down through valve 26 and to be dumped out through discharge chute 42. Pre-loading chamber 27 functions as a feed dose containing reservoir, such that between successive activations of gate 32, the feed is allowed to build up within pre-loading chamber 27 so that the dose of feed is then ready to be delivered all at once. This greatly reduces the amount of time that a user would overwise be forced to wait while auger 16 carries a feed dose up out of feed bin 12.

Figure 11:
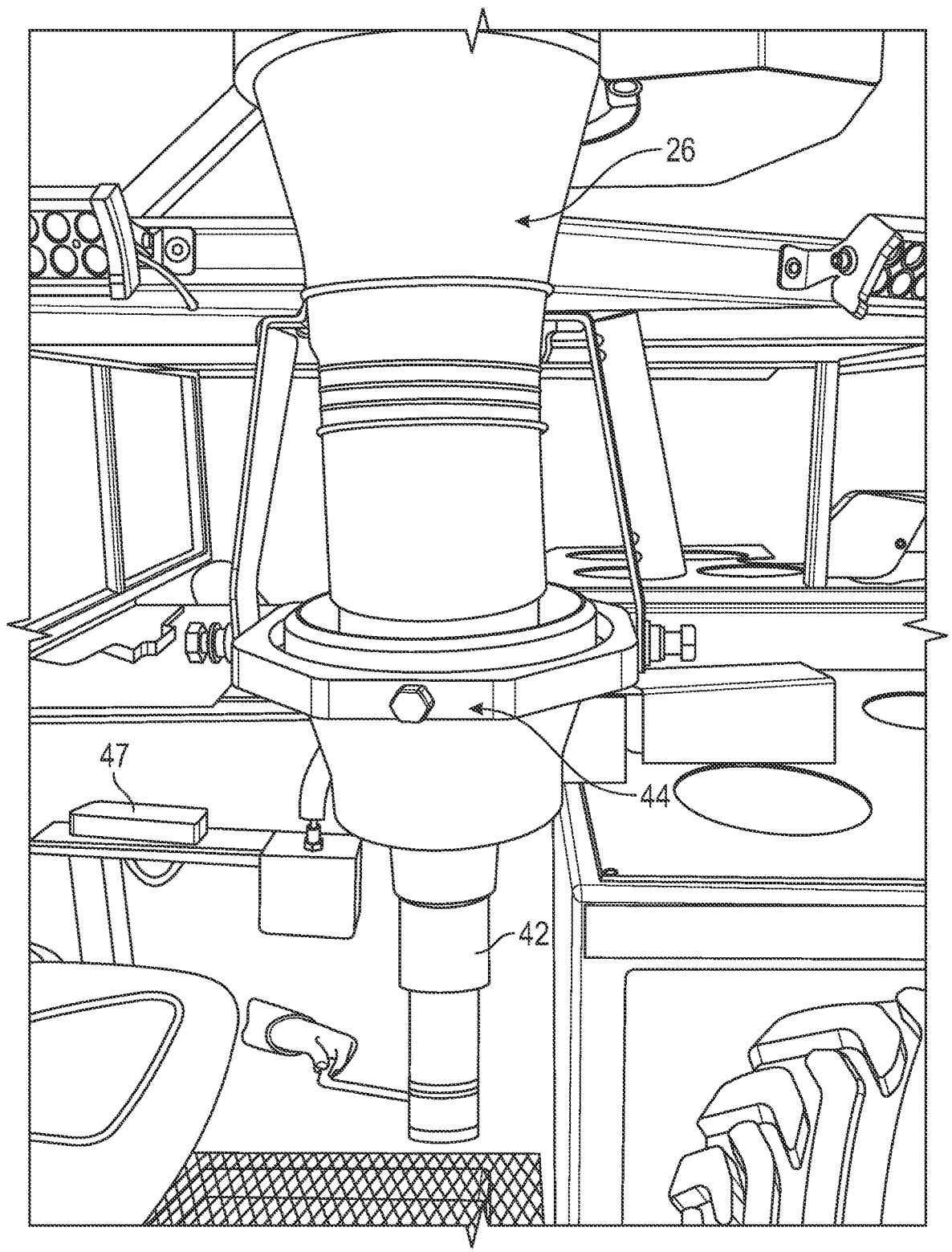
FIG. 11 is a drawing which illustrates a pivot connection for a discharge tube according to an embodiment of the present invention.

As best illustrated by comparing FIG. 1 with FIG. 11, rotational joint 44, be constructed in any desirable manner. For example, rotational joint 44 can be constructed such that it is able to pivot about two or more axes, as can preferably be provided by rotational joint 44 as seen in FIG. 1. Optionally, rotational joint 44 can be configured to rotate about a single axis, as illustrated in the configuration of FIG. 11, thus permitting discharge chute 42 to only swing out to a side of dispenser 10.

In one embodiment, sensor 46 is preferably positioned to detect when discharge chute 42 is moved to a predetermined position or a predetermined amount. When sensor 46 detects such predetermined position or movement, controller 47 (see FIG. 11) preferably initiates the activation of motor 30, which causes feed that is contained in second chute 24 to fall and be discharged from a terminal end of discharge chute 42. Controller 47 can include one or more microcontrollers, digital logic circuits, microprocessors, PLCs, or other computer or automated apparatus and/or a combination thereof. Sensor 46 also preferably causes controller 47 to activate first and second augers 14 and 16, thus causing feed to be drawn up and dumped into second chute 24 so that it is loaded with another quantity of feed to be discharged on the next activation as detected by sensor 46.

In one embodiment, a user can make an adjustment which preferably changes the amount of time that augers 14 and 16 are activated for, as well as the duration of activation of motor 30. For example, in one embodiment, a dial can be provided, which can be for example a digital encoder, a variable resistor, or any other user-input device wherein a user can indicate a desired amount of feed to be delivered such that controller 47 adjusts a signal that activates and/or deactivates augers 14 and 16 and/or motor 30. This can optionally include a digital keypad, a touch screen, a slider, a knob, a combination thereof, or another input device. As an example, if feed bin 12 is loaded with cattle feed pellets, and the user wishes to dispense about a pound of feed for a calf into feed bucket 48, the user can adjust the input device (for example, turn a knob to a first position) and this can cause augers 14 and 16 to turn a predetermined number of rotations, which can optionally be counted by sensor 70, for example by one or more magnets mounted on a side and/or end-portion of a shaft of one or both augers, and the output of sensor 70 can be counted by controller 47 until a predetermined number is reached. In one embodiment, sensor 70 and motor 18 can be independent from one another or they can be a single off-the-shelf unit, including but not limited to a whirligig motor unit. Likewise, motor 30 can be activated for about 350 milliseconds ("ms") in a first direction, thus rotating gate 32 out from between interfacing openings 28 in valve 26, and opening valve 26 to allow feed that is resting above gate 32 to begin falling down.

In one embodiment, immediately after the activation of motor 30, motor can then be immediately activated in an opposite direction, for example for a period of about 350 ms, which causes gate 32 to swing back into position between interfacing openings 28, thus closing valve 26. Optionally, no delay can be programmed to occur between the opening and closing of valve 26. Without delay, a relatively small amount of feed can fall through valve 26 before it is again closed. As a further example, if a user wishes to dispense relatively more feed, for example about five pounds of feed for an adult cow, the user can adjust the user-input, for example by turning a dial to a second position, which can cause augers 14 and 16 to be activated for a greater number of counts of sensor 70 and which can cause motor 30 to be activated in a first direction, for example for about 350 ms, before a delay is then introduced, for example a delay of about 500 ms, before motor 30 is then activated in an opposite direction for a predetermined amount of time (for example about 350 ms), thus closing valve 26. In one embodiment, a stop can be provided to stop gate 32 from rotating past a predetermined open and/or closed position. Another delay can also be provided to occur between successive activations of valve 26. For example, after motor 30 causes gate 32 to close, a delay can be provided before motor 30 is allowed to cause gate 32 to open. This delay can provide time between successive activations of valve 26 so that augers 14 and 16 can have time to refill feed into a holding area below or at a bottom of second chute 24, so that the feed is preloaded immediately above gate 32 of valve 26 so that the feed is ready to be dispensed before valve 26 activates.

Figure 8:
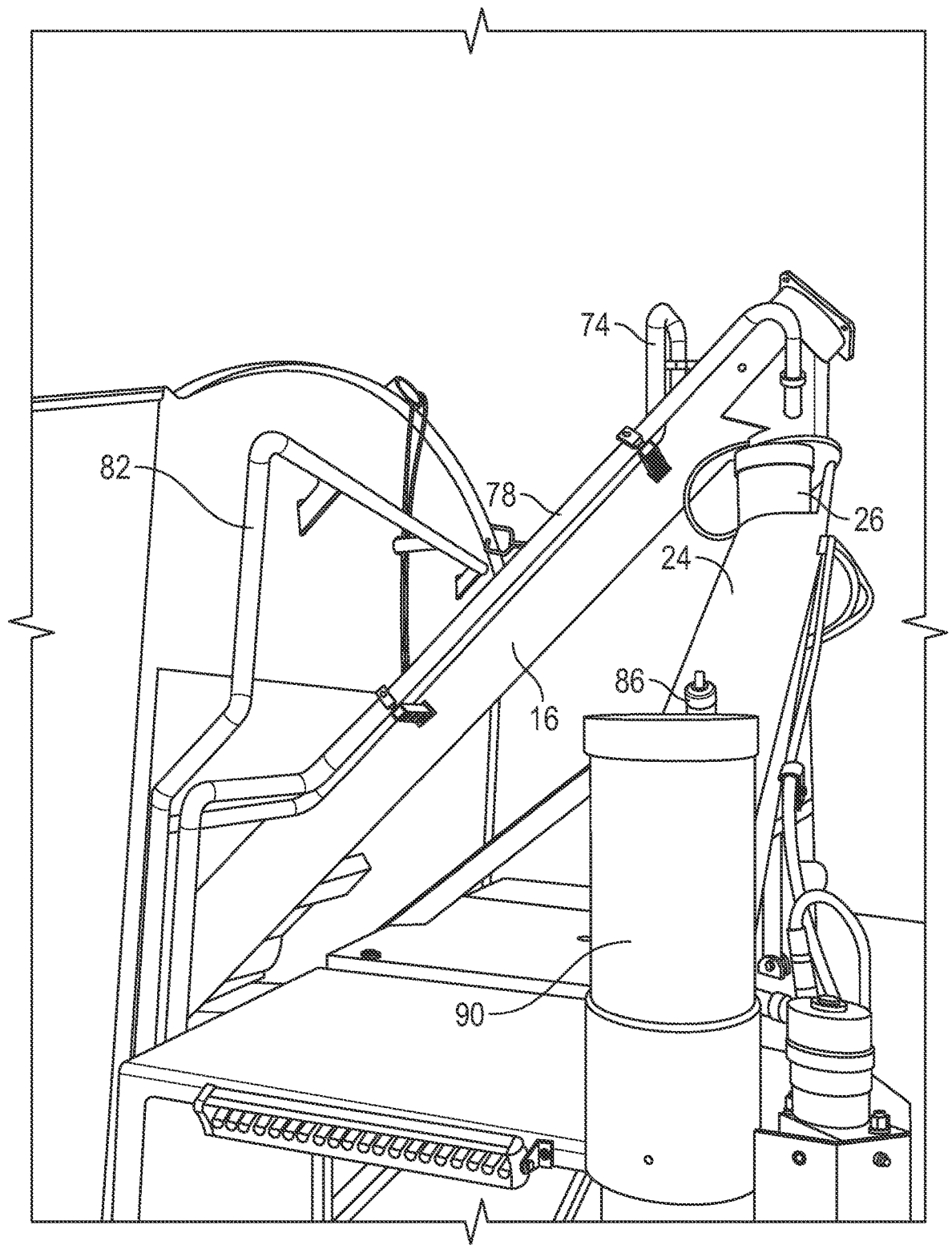
FIG. 8 is a drawing which illustrates various fluid ducting and a second auger according to an embodiment of the present invention.

As best illustrated in FIG. 8, proximity sensor 86 can be positioned on top of a portion of second chute 24. Proximity sensor 86 is preferably adjusted such that it does not detect feed when the feed is sliding freely down second chute 24 but does detect feed if the feed is caused to back up and begin filling second chute 24. When such backed-up feed is detected, controller 47 is preferably configured to stop first and second augers 14 and 16 and/or can optionally initiate an alert to the user to let the user know that feed is backing up into second chute 24. As also illustrated in FIG. 8, cleanout 90 is preferably provided above valve 26 such that a user can easily gain access to an internal portion of valve 26 for maintenance, repair, and/or cleaning.

Of course, other manners of activating augers 14 and/or 16 to move a predetermined amount of feed can be used and will provide desirable results. For example, augers 14 and/or 16 can be activated for a predetermined amount of time, or the number of rotations of one or both can be counted via some other device or apparatus (including for example digital encoders or an optical sensor and a disc with one or more notches or tabs). Alternatively, augers 14 and/or 16, can be powered by one or more stepper motors and such stepper motors can be stepped for a predetermined number of steps that are based at least in part on a user input. Likewise, motor 30 can optionally include a stepper motor.

In one embodiment, automated feed dispenser 10 can be driven via a joystick (for example via a hydrostatic drive). In one embodiment, automated feed dispenser 10 can have operator seats on a left and a right side thereof and second chute 24 and everything connected below it can be swung, via rotational joint 22, from a left side of the vehicle to a right side of the vehicle such that a user can operate automated feed dispenser 10, drive the vehicle, and dispense feed to either a left or a right side thereof. In one embodiment, the powered vehicle is controlled by a steering wheel with foot pedals. In one embodiment, the powered vehicle comprises a cruise control system. In one embodiment the cruise control system can change speeds in ⅛ mph increments.

In one embodiment, automated feed dispenser 10 can include trash bin 60 which is most preferably disposed in a front center portion of the vehicle. Trash bin 60 can include metal grate 63 disposed above it. In this embodiment, for example, if an operator sees old feed remaining in one or more feed buckets 48 (for example, if remaining feed from a previous feeding session has clumped together due to rain or has otherwise been contaminated), the operator can dump the old feed into bin 60 for disposal. Grate 63 can prevent large items from falling down into trash bin 60. In one embodiment, an additional bin can be disposed on automated feed dispenser 10 to haul dirty feed buckets 48 to be cleaned. Optionally, the dirty feed bucket bin can have a grate disposed over it. In one embodiment, the dirty feed bucket bin can be disposed in front of or behind trash bin 60.

Figure 6:
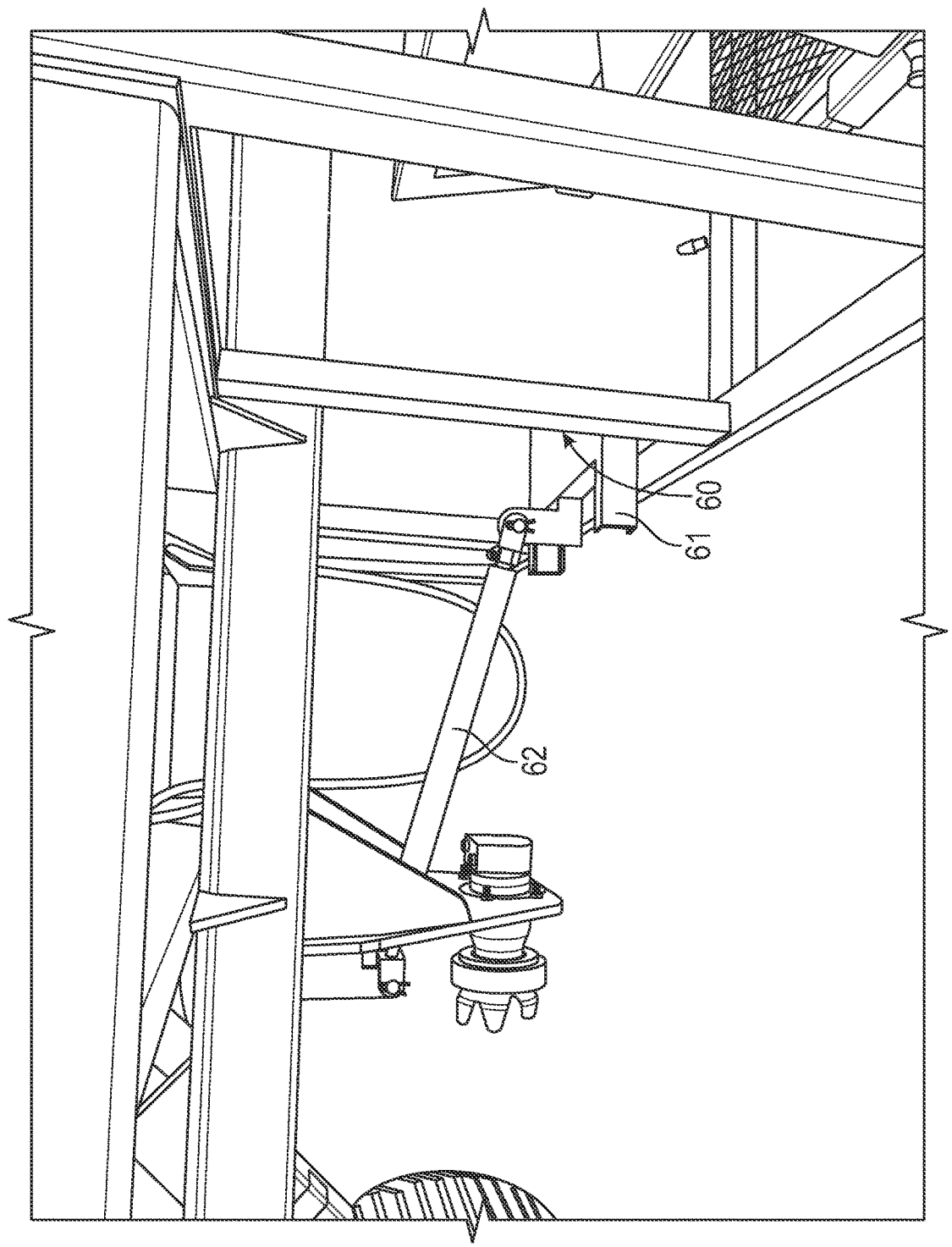
FIG. 6 is a drawing which illustrates a hydraulically-actuated sliding bottom section of the trash bin of the rapid feed dispensing vehicle of an embodiment of the present invention.

As best illustrated in FIG. 6, in one embodiment, trash bin 60 can optionally be dumped by opening a bottom of bin 60. For example, sliding bottom section 61 can be pulled open to allow the contents of trash bin 60 to dump out. In one embodiment, sliding bottom section 61 can be opened and closed via opening mechanism 62, which can optionally include a powered opening mechanism, including but not limited to a hydraulic or pneumatic cylinder, an electric or hydraulic motor, which itself can optionally include a linear actuator. To assist in dispensing feed at night, one or more lights can be positioned at various locations about dispenser 10. A plurality of feed bucket holders 64 (see FIG. 1) can optionally be provided on dispenser 10. In one embodiment, feed bucket holders 64 can include but are not limited to a plurality of openings that feed buckets 48 can sit down in. This enables dispenser 10 to transport one or more feed buckets such that they can be cleaned or replaced.

In one embodiment, dispenser 10 preferably pre-loads feed into a chute, which feed is held back by a fast-acting valve. Then, when a user is ready to dispense feed, the fast-acting valve can be opened to dump the preloaded feed. In one embodiment, the valve can be a valve that is not manually opened and closed. In one embodiment, the valve can be a fast-acting valve. In one embodiment, upon activation or immediately after activation of the valve, the chute can again be preloaded with feed—for example, by auguring feed from a feed bin into the chute. In one embodiment, one or more of the chutes, including but not limited to the second chute, can be lined with a plastic sleeve. In one embodiment, depending on the quantity of feed that is desired to be discharged, the chute can be formed such that it is a container, and the container itself can have a valve connected to or formed onto a bottom of the container such that the valve can be activated and the feed thus dumped from the preloaded container. In one embodiment, instead of sensor 46 initiating the dispensing of feed, a switch can be provided on handle 40 or in another location, including on a joystick, such that a user can activate the switch when the terminal end of discharge chute 42 is positioned at a desired location. In this embodiment, a switch is preferably provided which allows a user to select between manual button-activation and/or sensor 46-based activation. The activation of the switch can cause motor 30 and augers 14 and 16 to activate, thus causing preloaded feed to be dispensed and more feed to be preloaded. Although manual activation can optionally trigger motor 30 to open and close gate 32 as is the case in sensor 46-based activation, in an alternative embodiment, when a user selects manual activation, motor 30 can be activated for sufficient time to allow gate 32 to move to an open position. Then, each time that the user activates a dispense switch or button, augers 14 and 16 are preferably activated—thus allowing feed to be drawn up from feed bin 12 and fall freely down through and out of discharge chute 42 without being impeded by gate 32 of valve 26.

Figure 7:
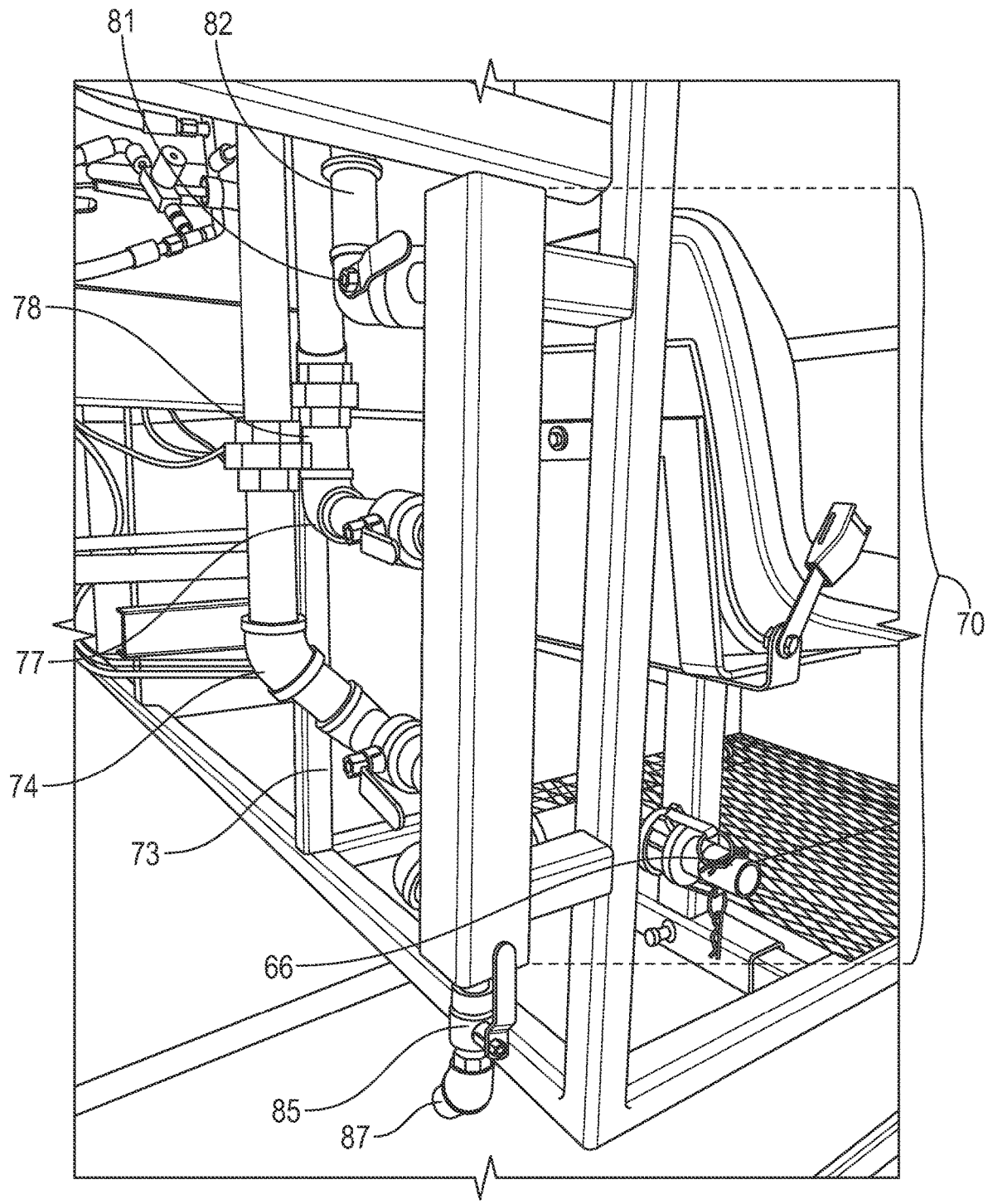
FIG. 7 is a drawing which illustrates a plurality of connection points for fluid ducting to facilitate washing the feed bin, chute, and auger, including various inlets and a drain outlet according to an embodiment of the present invention.

Referring now to FIGS. 7 and/or 8, in one embodiment, second auger 16 is preferably in communication with fluid ducting 74. The term "fluid ducting" is intended to include any device or structure which is intended to allow or facilitate the conveyance and/or passage of a fluid, including but not limited to pipes, fittings, tubing, hoses, lines, and/or combinations thereof. In one embodiment, second chute 24 is preferably in communication with fluid ducting 78. In one embodiment, feed bin 12 is preferably in communication with fluid ducting 82. Optionally fluid ducting 82 can be equipped with spray nozzles disposed within feed bin 12 such that then a wash fluid is forced through ducting 82, it is sprayed over a large area within feed bin 12. Although spray nozzles can optionally be disposed on the ends of fluid ducting 74 and 78, optionally the ends of those ducts can be left open such that wash fluid is allowed to flood through the respectively connected components. In one embodiment, connection points for each of fluid ducting 74, 78, and 82 are preferably provided at connection manifold 70 to allow a user to easily connect an external water supply to each ducting. Most preferably drain 87 is provided at the bottom of manifold 70 so that after a wash cycle, drain 87 can be opened to allow any residual wash fluid to drain out, thus preventing it from freezing and bursting any of the ducting or manifold 70. Most preferably inlet 66 is coupled to manifold 70.

Some feed is coated with molasses and other substances and can thus leave a residue behind. When a user wishes to wash out various components of automated feed dispenser 10, the user can empty the feed from automated feed dispenser 10, close each of valves 73, 77, 81, and 85, and connect an external wash fluid supply to inlet 66. Most preferably, the wash fluid supply is a supply of warm or hot water that most preferably has a flow rate of at least 10 gallons per minute and more preferably at least 50 gallons per minute and most preferably at least 100 gallons per minute. The user then opens one of valves 73, 77, or 81 to allow the wash fluid to flow through a respective fluid ducting 74, 78, and or 82, which ducts the wash fluid to the various internal components of automated feed dispenser 10 such that the fluid floods through the internal component and cleans it out. The user then closes, the valve and opens another valve and repeats the process again for each valve of the respective fluid ducting until feed dispenser 10 is washed out. In one embodiment, when washing various components, first auger 14 and/or second auger 16 can be configured to operate in a reverse direction. The user can then disconnect the supply of wash fluid and open valve 85 so that any residual wash fluid flows out of drain 87.

FIG. 8 illustrates another embodiment of automated feed dispenser 10, in which first auger 14 draws up feed and allows it to slide down second chute 24 dumps feed into loading chamber 27 so that it can then be discharged by activation of valve 26. Valve 26 is preferably positioned at an upper end of first auger 14. Valve 26 is preferably attached to an upper end of discharge chute 42. Down pipe 90 is preferably attached to a lower end of discharge chute 42. Sensor 86 is preferably positioned to detect when down pipe 90 is obstructed. In one embodiment, the functions of sensors 46 and 86 are combined into a single sensor.

Although embodiments of the present invention provide particularly desirable results for dispensing feed, in one embodiment, it can dispense other granular, pelletized, or other small solid items, including but not limited to sand, soil, gravel, other food products combinations thereof and the like. Optionally, feed dispenser 10 can have a cruise control system, which can optionally include the ability to adjust its travel speed in sub-mile per hour units (for example in steps of ⅛ of a mile per hour). In one embodiment, feed dispenser 10 can be operated with a joystick and/or with a steering wheel and foot pedals or any other user interface configuration.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing and/or control logic can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the amount or value given. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. An apparatus for dispensing feed comprising:
a feed bin;
a first auger, said first auger positioned to carry feed from said feed bin up to a first chute being in fluid communication with and rotably connected to a pre-loading chute;
a feed pre-loading chamber disposed below or at a bottom of said pre-loading chute;
a valve, said valve positioned below said feed pre-loading chamber, said valve comprising a motor and a gate;
a discharge chute, said discharge chute being in fluid communication with and positioned below said valve; and
said pre-loading chute, said pre-loading chamber, said valve, and said discharge chute being rotatable about a longitudinal axis of said first chute from a first side to an opposite side of the apparatus.

2. The apparatus of claim 1 further comprising a rotational joint in communication with said valve and said discharge chute.

3. The apparatus of claim 1 further comprising a powered vehicle and wherein said feed bin is coupled to said powered vehicle.

4. The apparatus of claim 1 further comprising a sensor in communication with said discharge chute.

5. The apparatus of claim 4 wherein said sensor is coupled to a controller.

6. The apparatus of claim 5 wherein said controller is configured to cause activation of said motor of said valve.

7. The apparatus of claim 1 further comprising one or more inputs communicably coupled to a controller and said controller configured to adjust one or more time delays associated with opening and/or closing of said valve based on said one or more inputs.

8. The apparatus of claim 1 further comprising a proximity sensor communicably coupled to said first auger and communicably coupled to said controller.

9. The apparatus of claim 1 further comprising a proximity sensor disposed on said pre-loading chute and configured to detect feed that has backed up into said pre-loading chute.

10. The apparatus of claim 3 further comprising a plurality of feed bucket holders formed in a top surface of the powered vehicle.

11. The apparatus of claim 3 further comprising a trash bin and a grate disposed on top of said trash bin formed in a top surface of the powered vehicle.

12. The apparatus of claim 1 further comprising a second auger, said second auger disposed in a bottom portion of said feed bin and said second auger configured to direct feed to said first auger.

13. The apparatus of claim 1 further comprising wash fluid ducting positioned to direct a wash fluid to an upper portion of said first auger.

14. The apparatus of claim 13 wherein said wash fluid ducting is positioned to direct wash fluid to an upper portion of said pre-loading chute.

15. The apparatus of claim 13 wherein said wash fluid ducting is positioned to direct wash fluid into said feed bin.

16. A method for rapidly dispensing feed into a feed station, the method comprising:
disposing bulk feed into a feed bin coupled to a top surface of a motorized vehicle;
drawing a first dose of feed up from the feed bin with an auger, where the first dose of feed contains a first predetermined amount of feed;
guiding the first dose of feed from the auger into and through a first chute, a rotational joint, and a pre-loading chute and into a pre-loading chamber with the pre-loading chute being in fluid communication with and rotably connected to the pre-loading chute by the rotational joint and the feed pre-loading chamber disposed below or at a bottom of the pre-loading chute and a lower end of the pre-loading chamber being connected to and closed by a gate;
actuating a gate valve operatively connected to the gate and configured to move the gate to open the lower end of the pre-loading chamber and dump the first dose of feed from the pre-loading chamber;
directing the dumped first dose of feed to the feed station through a discharge chute being in fluid communication with and positioned below the gate valve and the pre-loading chute, the pre-loading chamber, the valve, and the discharge chute being rotatable about a longitudinal axis of the first chute from a first side to an opposite side of the apparatus, the discharge chute configured to be manually controlled by a user with the user in a driver seat of the motorized vehicle;
closing the gate;
drawing a second dose of feed up from the feed bin with the auger, where the second dose of feed contains a second predetermined amount of feed; and
guiding the second dose of feed from the auger into and through the first chute, the rotational joint, and the pre-loading chute and into the pre-loading chamber with the lower end closed by the gate.

17. The method of claim 16 wherein directing the dumped feed to the feed station through a discharge chute further comprises the user manually manipulating the discharge chute to direct the dumped feed to the feed station by swinging at least a lower end portion of the discharge chute to a desired position.

18. The method of claim 16 wherein drawing a dose of feed up from a feed bin with the auger comprises counting a number of rotations of the auger to provide first predetermined amount of the first dose of feed.

19. The method of claim 16 wherein guiding the first dose of feed from the auger into and through the first chute, the rotational joint, and the pre-loading chute and into the pre-loading chamber with the lower end of the pre-loading chamber being closed by the gate further comprises stopping the auger after the predetermined amount of the first dose of feed has been provided from the auger to the pre-loading chamber.

20. The method of claim 16 further comprising washing internal components of a rapid feed dispenser without removing them by directing wash fluid to the internal components via fluid ducting attached to the rapid feed dispenser.

* * * * *